May 24, 1955 — L. S. HARTZOG — 2,709,013
DEPANNER MACHINE FOR BAKERY PRODUCTS
Filed Sept. 7, 1951 — 4 Sheets-Sheet 1

INVENTOR:
LEVY SHELTON HARTZOG
BY Carr & Carr & Gravely
ATTORNEYS.

May 24, 1955 L. S. HARTZOG 2,709,013
DEPANNER MACHINE FOR BAKERY PRODUCTS
Filed Sept. 7, 1951 4 Sheets-Sheet 2

INVENTOR:
LEVY SHELTON HARTZOG
By Carr & Carr & Gravely
ATTORNEYS.

May 24, 1955

L. S. HARTZOG 2,709,013

DEPANNER MACHINE FOR BAKERY PRODUCTS

Filed Sept. 7, 1951

INVENTOR:
LEVY SHELTON HARTZOG

By Carr & Carr & Gravely
ATTORNEYS.

May 24, 1955
L. S. HARTZOG
2,709,013
DEPANNER MACHINE FOR BAKERY PRODUCTS
Filed Sept. 7, 1951
4 Sheets-Sheet 4
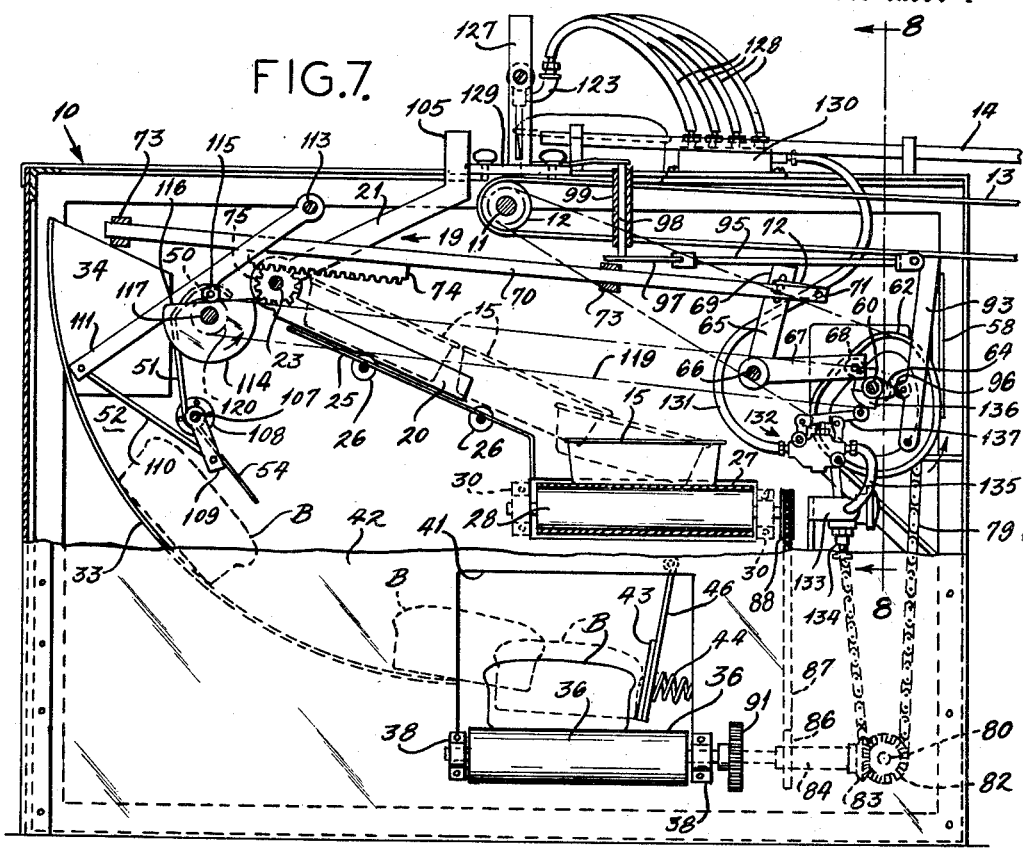
INVENTOR:
LEVY SHELTON HARTZOG
By Carr & Carr & Gravely
ATTORNEYS.

United States Patent Office 2,709,013
Patented May 24, 1955

2,709,013

DEPANNER MACHINE FOR BAKERY PRODUCTS

Levy Shelton Hartzog, Sikeston, Mo.

Application September 7, 1951, Serial No. 245,479

4 Claims. (Cl. 214—308)

This invention relates to bakery product depanner equipment, and is directed more particularly to an improved and automatically operating bakery product depanner machine.

A principal object of the present invention is to provide an automatic machine for removing bakery products from baking pans.

It is a further object to provide an automatic machine which is equipped with means to depan bakery products early in the cooling thereof, to avoid, as far as possible, damage to the bakery products caused by sticking in the baking pans.

It is a further object to provide a bakery product depanner machine which will operate to depan the products shortly after leaving the baking oven, so that the empty pans may be returned for re-use without having to go through the complete cycle of the cooling process, thereby making it possible to decrease the inventory of baking pans required.

The present invention consists in an automatically operating bakery product depanner machine having a suitable frame structure on which is disposed a conveyer which receives the bakery goods from the baking ovens and transports the same to a depanning zone in the machine, automatically operating mechanism in the depanning zone effective to invert the pans and effect the extraction or separation of the bakery products from the pans by a jarring action caused by allowing the pans to fall into an inverted position, means for re-inverting the products, and separate conveyor means communicating with the depanner zone of the machine, one conveyor receiving the empty pans for return for re-use and the other conveyor being adapted to receive the bakery products in the process of reinversion to assist in restoring the bakery products to an upright position, concurrently with movement from the machine to a cooling zone or into subsequent processing equipment.

The invention also consists in the automatically operating bakery product depanner machine above described together with the provision of jet means directed at the pans to initiate the loosening of the products from the pans prior to the inverting operation performed on the pans.

The invention further consists in a machine of the above described character provided with central drive means and improved mechanism correlating the several functions of the machine, whereby the objects of the present invention are more readily obtained.

The invention also consists in the improved bakery product depanner machine and in the several parts and combination of parts which will be hereinafter more specifically described in connection with the accompanying drawings, wherein:

Fig. 7 is a view similar to Fig. 1, but showing a modified machine having jet means for loosening the products in the pans before inversion; and Fig. 8 is a sectional view taken at line 8—8 in Fig. 7.

Figure 1:
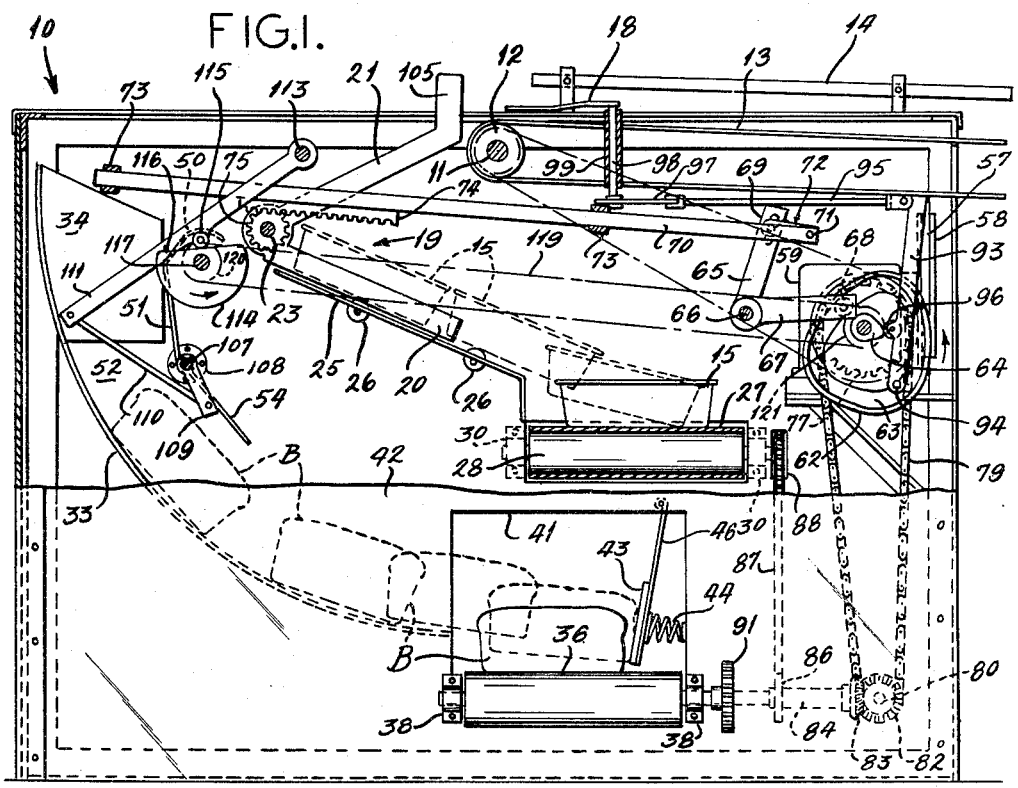
Fig. 1 is a diagrammatic side elevational view of the present bakery product depanner machine showing a presently preferred form which the invention may take.

Referring now to the several views of the drawings wherein the same parts will be referred to by the same numerals of reference, the bakery product depanner machine includes a frame structure 10 formed of a number of vertically and horizontally arranged and interconnected angle members which have not been specifically designated, since such structural members are well recognized and familiar to those skilled in the art. The upper horizontally directed frame members of the machine are adapted to carry suitable bearings (not shown) for a horizontal shaft 11 on which a conveyor roller 12 is mounted for supporting the discharge end of a conveyor belt 13. The opposite end of the conveyor belt 13 has not been shown, but it is understood to be connected with suitable supporting means located adjacent the baking oven. The oven end of the conveyor includes an idler roller similar to that shown at 12.

The frame 10 is provided at each side of the conveyor belt 13 with suitable guide rails 14 which act to confine the pans of bakery products as they issue from the baking oven to movement in the direction of the conveyor belt 13, and for the purpose of bringing the pans into proper position for discharge from the conveyor belt.

Figure 2:
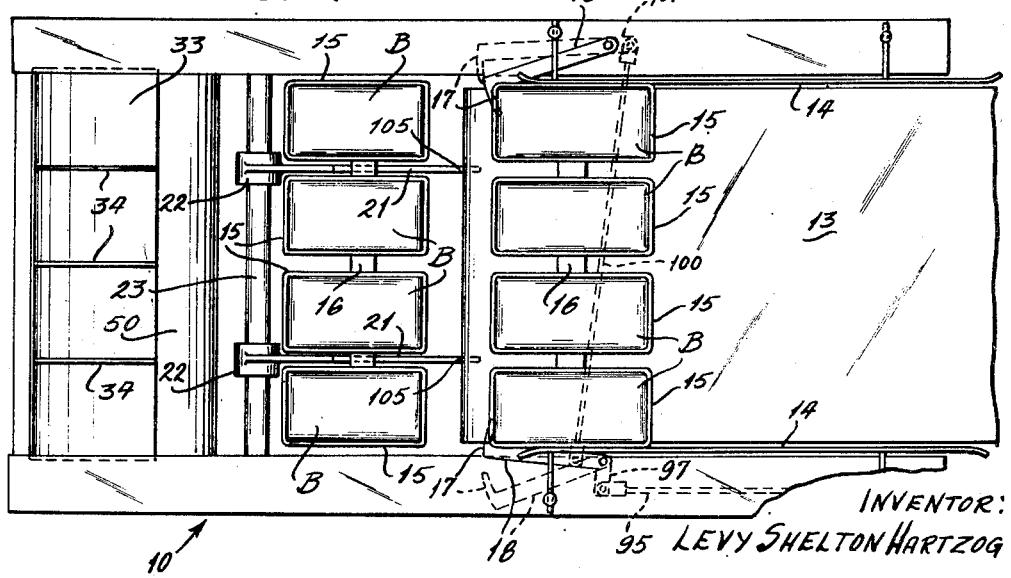
Fig. 2 is a top plan view of the machine of Fig. 1.
Figure 4:
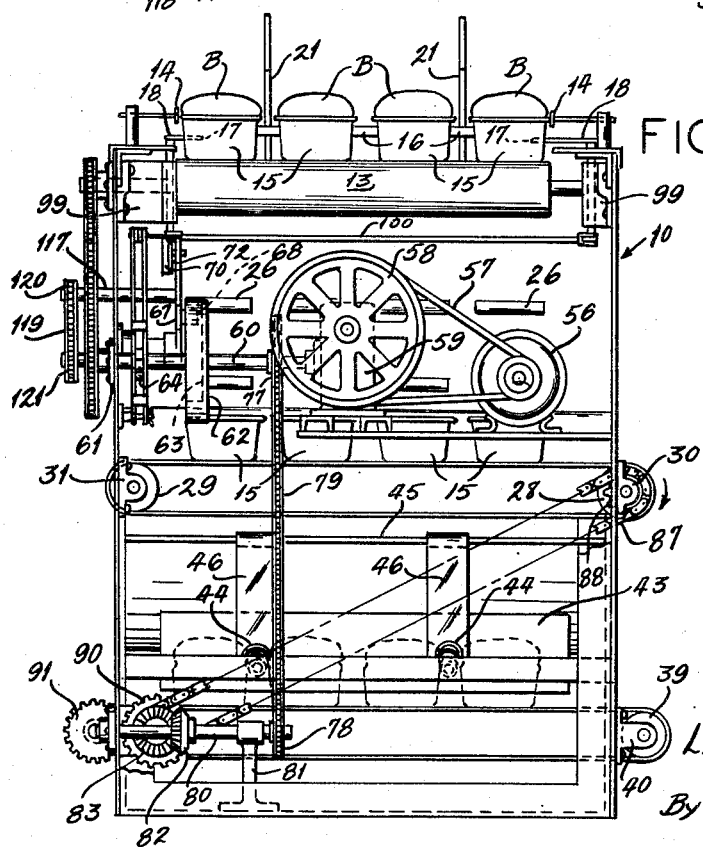
Fig. 4 is an end elevation of the depanner machine.

In the present machine, pan sets consisting of a group of four baking pans 15 are shown interconnected so as to move together, the interconnecting means being shown at 16 in Figs. 2, 4 and 8. The interconnecting means 16 per se has not been shown in detail, since it is not a part of the present invention. In the drawings, the bakery product illustrated is loaves of bread, designated by the letter B. The ensuing description of the machine and its operation will be that for the depanning of bread, but it should be clearly understood that the machine may be applied in connection with practically all of the commercial bakery products, with but few variations from that shown in the present drawings.

Since the present depanner machine may be used in connection with conveyor type commercial oven equipment, it is important that the interconnected pan sets 15 moving along the conveyor belt 13 be spaced or momentarily arrested in their movement to prevent a pile up in the machine. Accordingly, the machine is provided with a pair of cooperating arresting members (Figs. 1 and 2) which consist of suitably formed arms 18 having inturned finger elements 17. The arms 18 are arranged above the plane of the conveyor belt 13, and move into the path of the pan sets, so that the inturned finger elements 17 intercept the opposite end pans 15.

Figure 3:
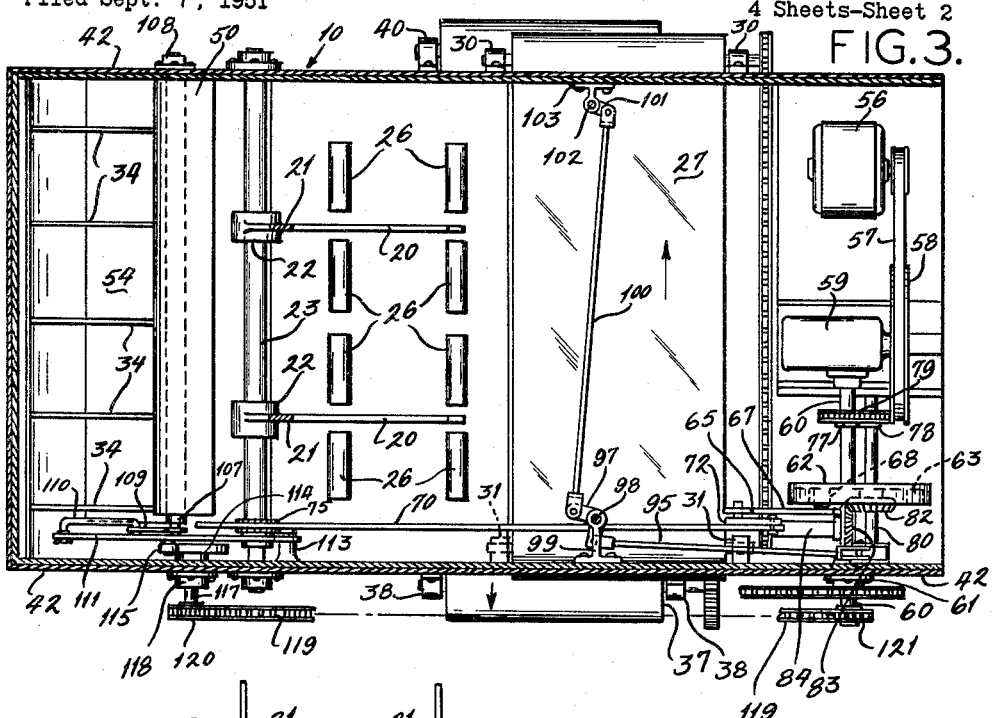
Fig. 3 is a longitudinal sectional view of the machine taken at line 3—3 in Fig. 5.
Figure 5:
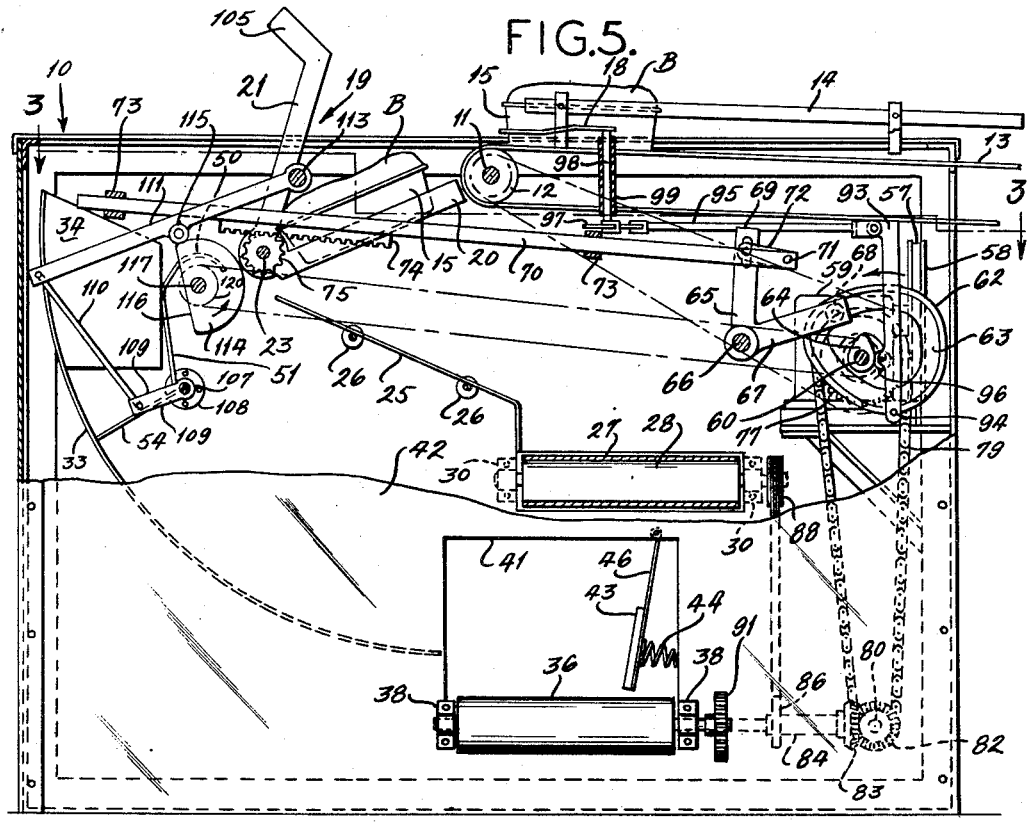
Fig. 5 is a diagrammatic view similar to that of Fig. 1 showing the bakery product depanner machine in one position of its operation.

Beyond the discharge end of the conveyor belt 13, Figs. 1 and 5, as defined by the belt roller 12 and shaft 11, there is operatively positioned an oscillating type depanner device 19 which consists in a plurality of pan supporting arms 20 and an angularly related plurality of pan supporting arms 21. These arms 20 and 21 are shown in Figs. 1, 2, and 3 arranged in pairs, that is one arm 20 and one arm 21 are carried on a common collar 22 which in turn is longitudinally adjustably carried by a shaft 23. The pairs of arms 20 and 21 are angularly spaced so as to provide sufficient room, whereby the arms 20 may be brought into position adjacent the discharge end of the conveyor 13 to receive the pan sets 15 loosely or without interference from the arms 21. This angular relation between the arms 20 and 21 is also determined on the basis of the required degree of shock or jar which it is necessary to impart to the pans 15 in the inversion thereof, for the purpose of separating the loaves of bread B from their respective pans without tearing or causing damage thereto. It is, of course, necessary to insure positive depanning of the bread loaves, and for this reason the baking pan sets 15 are permitted to flop or fall by gravity from a position supported on the arms 20 to an inverted position against the arms 21. This falling and inverting movement of the baking pans causes the proper degree of jar which will cause the loaves of bread to fall free of the pans without injury or disfigurement.

Adjacent the discharge end of the conveyor 13, between the belt shaft 11 and the supporting shaft 23 for the pairs of arms 20 and 21, is located an inclined plate 25 (Figs. 1 and 3) carrying a suitable number of fixed rollers 26, the plate and rollers constituting an inclined conveyor for receiving and directing the empty sets of pans 15 onto a lower transversely moving conveyor, represented by the conveyor belt 27 in Figs. 1, 3 and 4. With reference to Fig. 4, the conveyor belt 27 is shown operating between a live roller 28 at one longitudinal side of the present machine, and by an idler roller 29 suitably supported at the opposite longitudinal side of the machine. The live roller 28 is supported at its ends in suitable bearings 30, while the idler roller 29 is similarly supported in bearings 31.

A third conveyor is located outwardly and below the inclined conveyor 25—26, see Figs. 1, 3, and 4, and this conveyor consists in an inclined fixed member or chute 33 which is curved so that the upper receiving end thereof is directed substantially vertically and the opposite lower discharge end thereof is directed more nearly in a horizontal path. The receiving end of the curved conveyor chute 33 is provided with a plurality of parallel guide plates 34 (Figs. 1, 2, and 3) which maintain the individual loaves of bread separated, and also act to direct the individual loaves of bread into the conveyor 33. The loaves of bread are caused to slide by gravity on the curved surface of the chute 33 and are directed by the guide plates 34 in proper paths so that each group of loaves will substantially simultaneously be discharged from the lower horizontal end of the conveyor plate onto a transversely moving conveyor belt 36. The third conveyor also includes the conveyor belt 36, shown in Figs. 1, 3, and 4. This belt is provided with a live roller 37 carried in suitable bearings 38 at one longitudinal side of the machine, and by an idler roller 39 (Fig. 4) carried by suitable bearings 40 mounted at the opposite longitudinal side of the machine. The delivery end of the conveyor belt 36 is indicated in Fig. 1 at the discharge door or opening 41 formed in a side plate 42 enclosing part of the framework of the present depanner machine. In conjunction with the transverse conveyor belt 36 there is provided a buffer member 43 (Figs. 1 and 4) having resilient elements or springs 44 which normally holds the buffer member 43 outwardly over the conveyor belt 36. This buffer member is pivoted on the bar 45 by the arms 46, and is located so as to be struck by each group of bread loaves as they are conducted onto the conveyor 36. The impact reaction of the spring means 44 causes the buffer 43 to yield so as to smoothly and gently arrest the loaves of bread just before or substantially as they drop onto the conveyor belt 36.

In combination with the inclined chute 33 and the inlet guide plates 34 carried by the chute, there is provided a fixed re-inverting means in the form of a plate 50 which has a curved surface when viewed in sectional elevation. The curved re-inverting plate 50 is shown in full line in Fig. 3 and in sectional elevation in each of Figs. 2, 5, and 6. Plate 50 is provided with a depending angularly directed skirt 51, see Fig. 1, the skirt forming a throat area 52 adjacent the lower margins of the inlet guide plates 34, whereby the loaves of bread B are caused to enter the curved chute 33 through this throat and are prevented from getting out of lengthwise alignment by the limited passages formed between the guide plates 34. The fixed re-inverting means 50 is located at the opposite side of the pivot shaft 23 of the depanner device 19 from the inclined conveyor 25 over which the righted empty pan sets are discharged.

Figure 6:
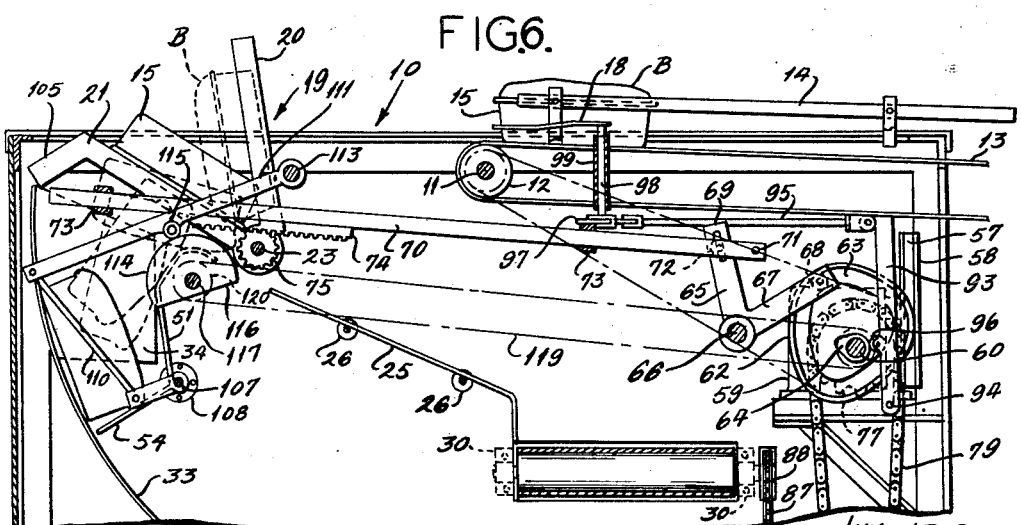
Fig. 6 is a fragmentary view similar to Fig. 5, but showing a further position of operation of the present machine.

The function of the re-inverting plate 50 is best seen in connection with Fig. 6, it being noted that the loaves of bread when inverted drop only a short distance to have their crust side engage the crown portion of the curved plate 50 near one end thereof. The loose bread loaves are thereby caused to continue rotating movement in the direction in which the depanner device moved for inverting the pan sets. This rotating movement follows closely the contour of the surface of the plate 50 until the loaves of bread reach a position adjacent the skirt 51. At this point in the re-inverting operation of the machine, the loaves of bread are securely confined in the limited entrance passages formed by the several guide plates 34 and are not provided with sufficient lateral space in the throat area 52 to be allowed to tumble or in any way escape from the desired position moving longitudinally down the curved surface of the chute 33.

It sometimes occurs in the depanning of bakery products, that one or more of the products may momentarily hang or stick in the baking pan, while others are freely loosened and fall immediately into the chute 33. The sticking bakery products sometimes cause troublesome problems in connection with the delivery of the product to the discharge conveyor belt 36 located at the delivery end of the curved chute 33. The present improvements, therefore, include an arresting means located adjacent the throat zone 52 of the shoe 33. This arresting means consists in a door or other similar plate 54 which may be pivoted from a closed position, shown in Fig. 5, to a fully opened position shown in connection with Fig. 1. The closed position of the door 54 is maintained for a sufficient time to permit all of the loaves of bread, for example, including those which have a tendency to stick or hang in the baking pans, to reach a position fully within the throat zone of the shoe 33 and resting on the door plate 54. Thereafter, opening movement of the door 54 will simultaneously release all of the bread loaves so that they may slide together down the remaining portion of the curved chute 33 and arrive substantially simultaneously on the discharge conveyor belt 36.

Detailed reference will now be made to a preferred means which will render the presently improved depanner machine substantially automatic in operation. Attention will first be directed to Figs. 3 and 4, where there is shown the conventional electric motor 56 connected by a belt 57 to the drive pulley 58 of a conventional reduction gear transmission 59. The details of the transmission 59 are not important to the present invention and no particular description or showing has been made thereof. The transmission is provided with a projecting drive shaft 60 which is supported in the bearing 61 carried by the side panel 42 of the present machine frame. Shaft 60 carries a control cam member 62 which is provided with an internal cam track 63 having a predetermined contour for a purpose presently to appear. A second control cam 64 (Figs. 1 and 4) is also fixed on the drive shaft 60 adjacent the cam member 62.

The control cam member 62 is adapted to operate the depanner device 19 in the following manner; a bell crank 65 pivoted at 66 has one arm 67 projecting adjacent the cam member 62 so that a follower roller 68 may move in the cam track 63. The opposite arm 69 of the bell crank 65 is connected to a reciprocating bar 70 by means of pin 71 in the bar 70 engaging a compensating link 72, in turn, connected to the arm 69. The reciprocating member 70 is guided in a substantially straight line movement by suitable guide elements 73. Intermediate the location of the cooperating guide elements 73, the member 70 carries a rack 74 engaging with a spur gear 75 fixed on the pivot shaft 23 for the depanner device 19.

It may now be seen that operation of the electric motor 56 will rotate drive shaft 60 through the transmission 59 and result in an oscillating movement of the bell crank 65 following the predetermined movement dictated by the shape of the cam track 63 in the cam member 62. The shape of the cam track 63, is designed to impart to the oscillating depanner device 19 a certain movement which includes periods of dwell in those positions of the depanner device shown in Figs. 1, 5 and 6. At these three stages in the movement of the depanner device 19, the empty pans 15 require a short interval of time in order to clear the supporting arms 20. Likewise, in Fig. 5, the respective arms 20 and 21 of the depanner device momentarily must be stopped while a loaded pan set is passing from the conveyor belt 13 onto the supporting arms 20. In a similar manner, the position of the depanner device 19 shown in Fig. 6 must be accompanied by a period of dwell in which the pan sets flop or fall forwardly and strike the opposite arms 21, followed by a sufficient period of immobility to allow the bread loaves to free themselves from the pans 15 and fall clear thereof.

The operation of the depanner machine disclosed in connection with Fig. 1, shows the empty pan sets 15 moving, in broken outline, down the inclined conveyor plate 25 and onto the conveyor belt 27, in full line. Operation of the conveyor belt 27 is obtained from the drive shaft 60 by means of a sprocket wheel 77 (Figs. 3 and 4) driving a lower sprocket wheel 78 by means of the chain 79, the lower sprocket 78 being fixed to an auxiliary drive shaft 80. The drive shaft 80 is mounted in a bearing pedestal 81 of any suitable type, and carries at one side thereof beveled gear 82 meshing with a second beveled gear 83 fixed on shaft 84. Shaft 84 extends longitudinally and at one lower side of the frame of the machine 10 and is mounted in suitable bearing means (not shown). The shaft 84 carries a sprocket 86 connected by a chain 87 to a sprocket 88 driving the roll 28 for conveyor belt 27 in the direction shown by the arrow in Fig. 4.

The loaves of bread B descending along the curved chute 33, shown in broken outline, are eventually deposited on the conveyor belt 36, as shown in full line. The conveyor belt 36 delivers the bread loaves at the discharge door 41, and obtains its drive from the shaft 84 by means of a pair of spur gears 90 and 91 (Figs. 3, 4 and 7). The spur gear 90 is fixed on the shaft 84 and the spur gear 91 is fixed on the shaft of the drive roller for the conveyor belt 36.

In commercial bakeries, where the baking ovens are equipped with conveyor belts for moving the products to be baked therethrough, there is a fairly uniform delivery of the products from the baking ovens. On the other hand, the depanner machine must not be operated at too high a speed in order to avoid damage to the bread loaves and possible accumulation of pans and loaves of bread in the machine. Accordingly, the delivery conveyor belt 13 is provided with stop means shown at the arms 18, previously referred to in Figs. 1 and 2. The operation of the stop arms 18 is obtained from the control cam 64 on the drive shaft 60. A lever 93 (Fig. 1) is pivoted at one end on element 94 and is connected to an operating link 95 at its opposite end. The lever 93 carries a follower roller 96 intermediate its ends, the roller 96 engaging cam 64 and causing movement of the lever 93 in accordance with the cam contour as is well understood. The operating link 95 is connected to a bell crank 97 which is carried by a vertically arranged shaft 98, in turn carried by a bearing 99. The bell crank 97 is connected to a cross link 100, and the cross link is connected to a lever 101 fixed on a vertically directed shaft 102 carried by a bearing pedestal 103. The shaft 98 has one of the stop arms 18 fixed at its upper end, that is above the plane of the conveyor belt 13. In a similar manner, the opposite vertical shaft 102 carries the opposite stop arm 18 at its upper end. It will be observed that the cross link 100 is connected in a reverse fashion to the bell crank 97 relative to the lever 101, whereby to provide equal and opposite movement of the respective stop arms 18. The control cam 64 for the stop arms 18, is angularly related with the cam member 62 to secure the proper timed relation between movement of the stop arms 18 in the proper direction, shown in broken outline in Fig. 2, to release the next or succeeding pan set. This movement of arms 18 occurs at a time when the depanner device 19 is approximately in the position shown in Fig. 5. It is obvious that the stop arms 18 must be in stop position, shown in full line in Fig. 2, during the period when the depanner device 19 oscillates from the position shown in Fig. 5 to the position shown in Fig. 6 where the pan set is completely inverted, and return through the empty pan discharge position shown in Fig. 1, back to the position shown in Fig. 5.

The depanner device 19 is also shown equipped with an additional stop means which is in the nature of a safety device supplementing the action of the stop arms 18. This means is shown at 105 in Figs. 1, 5 and 6 and, in the form of angular extensions to the respective arms 21 of the depanner device 19. Observe, in Fig. 1, that while the depanner device 19 is in the empty pan discharge position, the extensions 105 project upwardly closely adjacent the discharge end of the conveyor belt 13. Should the stop arms 18 operate defectively or cease to operate, the extensions 105 on arms 21 would then become effective to prevent a succeeding pan set from moving off the conveyor belt 13 on top of the arms 21, instead of in the angular space between the arms 21 and 20.

The arresting means 54, adjacent the discharge from the depanner device 19, is carried on a pivot element 107 (Figs. 1, 3 and 5) carried between the side walls 42 by bearing means 108. The means or door 54 is provided with an arm 109 which is connected by the link 110 with the oscillating lever 111 pivoted at 113 and resting on a drive cam 114 by means of the follower roller 115 (Figs. 1, 3 and 5). Drive cam 114 is formed with a circular face flat on one side, as at 116, to regulate the period (Fig. 1) when the door 54 is open.

Cam 114 is carried on shaft 117 which is, in turn, carried in the bearing 118. The shaft 117 is rotated by the chain 119 (Figs. 1, 3 and 4) engaging the shaft sprocket 120 and extending into driven connection with the sprocket 121 on the main drive shaft 60. Thus, the door 54 moves in timed sequence with the depanner device 19, since both are responsive to the rotation of the main drive shaft 60.

In Figs. 7 and 8, the depanner machine is shown equipped with jet means which acts to loosen the bakery products in the pans prior to depanning. This prevents sticking and tearing of the products upon inversion in the depanning process. In other respects, the machine is like that of Fig. 1.

The jet means consists in a plurality of jets 123, of known type, adjustably arranged on the slide member 124 by the slides 125 and thumb screws 126. The member 124 is adjustably carried by the end brackets 127. Each jet 123 is supplied with air under regulated pressure by the flexible tube 128. All of the tubes 128 are connected to a common distributor 130, in turn, supplied by the principal conduit 131. The air for the distributor is intermittently supplied through the control valve 132 from a pressure reducing device 133 which may be adjusted by the valve 134. The pressure reducer 133 is in the main air supply line 135 for the control valve 132.

Control of the intermittent air supply for the jets 123 is effected through a cam 136 on the main drive shaft 60, which cam operates a lever 137 on the valve 132. The cam 136 is angularly set to operate to deliver air for the jets 123 while the stops 17 are holding a pan set in the position shown in Fig. 7.

The jets 123 may be adjusted in both a horizontal and vertical direction. The preference is to direct the jets at the leading edge of the pan so that the air will cause the product to separate from the end wall of the pan. As the separating action of the air jet progresses into the space between the product and the pan, it gently breaks the adhesion with the pan and loosens the products for subsequent depanning, as described.

The use of jet means in the manner described may be in connection with similar depanner machines, and it may consist of one or any number of jets, four being shown. The jets are so mounted as to be adjustable in three directions, since the brackets 127 are adjustably connected with the frame of the machine at slide means 129. The loosening action of the jets prevents tearing of the bakery products as the pans are inverted and allowed to fall the short distance between the angular arms 20 and 21 of the depanner device 19.

It is to be understood that only certain presently preferred embodiments of the depanner machine have been shown and described herein. However, it is contemplated that changes and modifications may be made within the scope of the annexed claims.

I claim:

1. In a depanner machine for removing bakery products from a baking pan set, a depanner device receiving pan sets and inverting the same to cause the bakery products to fall therefrom, a re-inverting member having a curved surface in the path of the falling bakery products and by which the latter are caused to rotate, an inclined conveyor chute having a curved surface spaced from said curved surface of the reinverting member and adapted to guide the products into a righted position, an arresting member adjacent said chute and reinverting member to accumulate the bakery products from the pan set, and mechanical means operating said depanner device and said arresting member in timed relation to accumulate the bakery products falling from the inverted pan sets and release the same for simultaneous movement along said inclined chute.

2. The combination in a depanner machine, of a periodically movable depanner device to discharge bakery products from pans, a product catching and turning member positioned close to the discharge zone of said device, said member having a skirt extension, a chute providing a curved entrance adjacent said skirt extension forming a close fitting throat to receive the bakery products, and a collecting device adjacent the throat to collect the products and release the same simultaneously in timed relation with said depanner device.

3. The combination in a depanner machine, of a reversibly movable depanner device to invert and discharge the contents of the pans, a member in fixed position close to the zone of pan discharge to initially catch the discharged contents and limit the fall thereof, a chute having a curved surface with its entrance portion spaced from said fixed member, said fixed member and chute entrance portion forming a throat to receive the contents and control the fall thereof to a righted position, and movable gate means beyond said throat to accumulate the contents and release the same simultaneously to further control the fall thereof.

4. The combination set forth in claim 3, wherein said gate means is located close to said fixed member to limit the fall of the discharged contents to a position in said throat.

References Cited in the file of this patent

UNITED STATES PATENTS

| Number | Name | Date |
|---|---|---|
| 610,635 | McKay | Sept. 13, 1898 |
| 1,427,679 | Eggert | Aug. 29, 1922 |
| 1,473,996 | McGarry | Nov. 3, 1923 |
| 1,506,632 | Gruetter | Aug. 26, 1924 |
| 1,561,664 | Rathwell | Nov. 17, 1925 |
| 1,879,393 | Miller | Sept. 27, 1932 |
| 2,271,937 | Engels | Feb. 3, 1942 |
| 2,462,021 | Harker | Feb. 15, 1949 |
| 2,524,656 | Eyster | Oct. 3, 1950 |
| 2,567,819 | Matteson | Sept. 11, 1951 |
| 2,633,258 | Temple | Mar. 31, 1953 |
| 2,639,828 | Otte | May 26, 1953 |